United States Patent
Wang et al.

(10) Patent No.: US 8,711,791 B2
(45) Date of Patent: Apr. 29, 2014

(54) DENIAL OF SERVICE (DOS) ATTACK PREVENTION THROUGH RANDOM ACCESS CHANNEL RESOURCE REALLOCATION

(75) Inventors: Yi-Pin Eric Wang, Fremont, CA (US); Dennis Hui, Sunnyvale, CA (US); Havish Koorapaty, Saratoga, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 491 days.

(21) Appl. No.: 12/972,688

(22) Filed: Dec. 20, 2010

(65) Prior Publication Data

US 2012/0155274 A1 Jun. 21, 2012

(51) Int. Cl.
*H04W 4/00* (2009.01)

(52) U.S. Cl.
USPC ............................ 370/329; 370/431

(58) Field of Classification Search
USPC ......... 370/229, 232, 233, 234, 237, 252, 253, 370/242, 245, 248, 328, 329, 330, 431, 370/432; 709/235
See application file for complete search history.

(56) References Cited

U.S. PATENT DOCUMENTS

| | | | | |
|---|---|---|---|---|
| 7,043,751 | B1 * | 5/2006 | Fischer et al. ................. | 726/7 |
| 8,422,484 | B2 * | 4/2013 | Iwai et al. ..................... | 370/350 |
| 2002/0052206 | A1 * | 5/2002 | Longoni ....................... | 455/453 |
| 2002/0101819 | A1 * | 8/2002 | Goldstone .................... | 370/229 |
| 2002/0141331 | A1 * | 10/2002 | Mate et al. ................... | 370/218 |
| 2003/0142623 | A1 * | 7/2003 | Bernhard et al. ............. | 370/229 |
| 2004/0192320 | A1 * | 9/2004 | Khawand et al. ........... | 455/452.1 |
| 2005/0271025 | A1 * | 12/2005 | Guethaus et al. ............ | 370/342 |
| 2006/0187821 | A1 * | 8/2006 | Watanabe et al. ............ | 370/229 |
| 2007/0140115 | A1 * | 6/2007 | Bienas et al. ................. | 370/230 |
| 2007/0224963 | A1 * | 9/2007 | Moscovitz et al. ........... | 455/296 |
| 2008/0316961 | A1 * | 12/2008 | Bertrand et al. .............. | 370/329 |
| 2009/0221293 | A1 * | 9/2009 | Petrovic et al. .............. | 455/450 |
| 2010/0080135 | A1 * | 4/2010 | Ishii et al. ..................... | 370/252 |
| 2010/0113053 | A1 * | 5/2010 | Bienas et al. ................. | 455/452.1 |
| 2010/0240377 | A1 * | 9/2010 | De Pasquale et al. ........ | 455/445 |
| 2010/0254351 | A1 * | 10/2010 | Wang et al. ................... | 370/332 |
| 2010/0272007 | A1 * | 10/2010 | Shen et al. .................... | 370/315 |
| 2011/0096748 | A1 * | 4/2011 | Meyer et al. .................. | 370/329 |
| 2012/0039171 | A1 * | 2/2012 | Yamada et al. ............... | 370/232 |
| 2012/0082099 | A1 * | 4/2012 | Bienas et al. ................. | 370/329 |
| 2012/0113939 | A1 * | 5/2012 | Kim et al. ..................... | 370/329 |
| 2013/0051214 | A1 * | 2/2013 | Fong et al. .................... | 370/216 |
| 2013/0153298 | A1 * | 6/2013 | Pietraski et al. .............. | 175/45 |

OTHER PUBLICATIONS

Lee P. et al. On the Detection of Signaling DoS Attacks on 3G Wireless Netowkrs. Proceedings of IEEE INFOCOM. Anchorage, Alaska. May 2007.*
Lee, P. et al. On the Detection of Signaling DoS Attacks on 3G Wireless Networks Proc in Proceedings of IEEE INFOCOM. Anchorage, Alaska. May 2007.

(Continued)

*Primary Examiner* — Paul H Masur
*Assistant Examiner* — Michael Phillips

(57) ABSTRACT

A method of managing wireless transmissions from a mobile handset includes determining whether the mobile handset is a source of a Random Access Channel (RACH) overload in the wireless network and, upon determining that the mobile handset is a source of the RACH overload, configuring the mobile handset to replace usage of a first RACH resource causing the RACH overload with usage of a second RACH resource specified by the processor.

19 Claims, 3 Drawing Sheets

(56) References Cited

OTHER PUBLICATIONS

Huawei: "RAN overload control solutions", 3GPP Draft: R2-103967 RAN Overload Control Solutions, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628: Jun. 21, 2010, XP050451070, [retrieved on Jun. 21, 2010] the whole document.

Huawei: "TP to 37.868 on different MTC approaches", 3GPP Draft; R2-104079, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20160628, Jul. 2, 2010, XP050451425, [retrieved on Jul. 2, 2010] the whole document.

ZTE: "Rach overload solutions", 3GPP Draft; R2-103742 Rach Overload Solutions, 3rd Generation Partnership Project (3GPP), Mobile Competence Centre; 650, Route Des Lucioles; F-06921 Sophia-Antpolis Cedex; France, vol. RAN WG2, No. Stockholm, Sweden; 20100628, Jun. 22, 2010, XP050451211, [retrieved on Jun. 22, 2010] the whole document.

* cited by examiner

DENIAL OF SERVICE (DOS) ATTACK PREVENTION THROUGH RANDOM ACCESS CHANNEL RESOURCE REALLOCATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to handling of signaling attacks in wireless networks. More particularly, and not by way of limitation, the present invention is directed to a system and method to substantially prevent Denial of Service (DoS) attacks in a cellular wireless network through reallocation of Random Access Channel (RACH) resources.

Today's broadband cellular wireless networks with expanded voice and data capabilities are increasingly becoming vulnerable to cyber attacks because of rapid growth in packet data traffic in these networks. As opposed to most wireline links, wireless links tend to have a much limited bandwidth. Hence, it takes a significantly less traffic to quickly overload a wireless connection. Furthermore, in today's third (3G) and fourth (4G) generation wireless networks, a large amount of signaling is carried out—even for a small amount of data transfer—to efficiently and optimally use limited radio resources. On the other hand, wireline networks may not need to resort to such extensive signaling for routine data transfer operations. Thus, today's cellular networks remain inherently susceptible to cyber attacks, such as, for example, a Denial of Service (DoS) attack through exhaustion of a wireless network's limited signaling channel resources.

It is observed from above that wireless networks are less robust than wireline networks, especially when it comes to being vulnerable to DoS attacks. Not only do "traditional" wireline DoS attacks apply in a wireless domain, a wireless network's limited radio resource availability and bandwidth may expose the network to additional wireless-specific DoS attacks. For example, a malicious remote host may create havoc in the signaling plane of a 3G network by repeatedly triggering radio channel allocations and revocations for targeted mobile handsets as explained more fully in "On the Detection of Signaling DoS Attacks on 3G Wireless Networks" by Patrick P. C. Lee, Tian Bu, and Thomas Woo, in *Proc in Proceedings of IEEE INFOCOM*, Anchorage, Ak., May 2007. A low rate, low volume attack traffic from such a malicious host can still cause significant potential damage including (1) overloading of Radio Network Controller (RNC) and Base Station (BS), leading to reduced system performance, (2) denial of service to legitimate signaling messages due to congestion in the signaling paths, and (3) shortening of a (targeted) mobile handset's battery life. In other words, unlike conventional DoS attacks in the wireless data plane, the signaling DoS attacks do not have to generate aggressive data traffic in the network to cause aggravated damage.

The detection algorithms identifying signaling DoS attacks in wireless networks may achieve high detection probability, low false alarm probability, and may have low detection time. Once a host is detected as malicious, a reaction mechanism may basically filter out subsequent traffic from the identified malicious host.

SUMMARY

As mentioned above, once a malicious host is identified as creating signaling DoS attacks in a wireless network, a solution is to filter out subsequent traffic from that malicious host. However, in cellular networks such as 3G and Long Term Evolution (LTE) networks (including 4G networks), the Random Access Channel (RACH) message is used by mobile stations/handsets to initialize communications with a base station in the network. Thus, while the network may be able to block other signaling messages from a mobile that has been a target of the malicious host, it may be hard for the network to block RACH signaling from such an "infected" mobile. This inability of the network to block RACH signaling may cause RACH overload of the cell, thereby resulting in DoS to other legitimate users in the network. Furthermore, RACH overload may also be caused by many users using poorly designed (or infected/corrupted) mobile handset software that sends RACH signaling too frequently.

It is therefore desirable to devise a reaction mechanism to substantially prevent DoS attacks due to RACH overload in cellular wireless networks. In view of limited radio resources available in a wireless network, it is further desirable that the prevention of DoS attacks be accomplished with network's existing radio resources and signaling framework, and without significant disruption to network architecture or functionality.

The present invention provides a solution to the above-mentioned problem of DoS attacks due to RACH overload. In one embodiment of the present invention, once a mobile handset is identified to cause (or contribute significantly to) a RACH overload of the cell, the system sends a special SIB (System Information Block) message targeted to that mobile handset and instructing it to redirect its RACH signaling to a separate RACH resource or to a small part of the current RACH resources. This allows most or all of the regular RACH resources from being overloaded by a single user or a group of users.

In one embodiment, the present invention is directed to a method of managing wireless transmissions from a mobile handset operating in a wireless network associated with the mobile handset. Using a processor in wireless communication with the mobile handset via the wireless network, the method includes the steps of determining whether the mobile handset is a source of a RACH overload in the wireless network; and, upon determining that the mobile handset is a source of the RACH overload, configuring the mobile handset to replace usage of a first RACH resource causing the RACH overload with usage of a second RACH resource specified by the processor.

In another embodiment, the present invention is directed to a mobile communication node configured to provide radio interface to a mobile handset in a wireless network associated with the mobile handset. The mobile communication node comprises a receiver operable to receive wireless transmissions from a mobile handset. The mobile communication node further comprises a processor operable to: determine whether the mobile handset is a source of a RACH overload in the wireless network; and configure the mobile handset to replace usage of a first RACH resource causing the RACH overload with a second RACH resource specified by the processor when the processor determines that the mobile handset is a source of the RACH overload.

In another embodiment, the present invention is directed to a method that includes the steps of: using a processor, establishing wireless communication with a mobile handset via a wireless network associated with the mobile handset; using the processor, monitoring a number of RACH preamble transmissions from the mobile handset; using the processor, identifying the mobile handset as a source of a RACH overload when the number of RACH preamble transmissions from the mobile handset in a time interval exceeds a pre-determined threshold; and, upon determining that the mobile handset is a source of the RACH overload, configuring the mobile handset, using the processor, to replace usage of a first RACH resource causing the RACH overload with usage of a second RACH resource specified by the processor, wherein the second RACH resource is different from the first RACH resource.

In a further embodiment, the present invention is directed to a system for preventing a DoS attack in a wireless network. The system comprises a mobile handset operable in a wireless network; and a mobile communication node for providing a radio interface to the mobile handset in the wireless network. The mobile communication node is configured to determine whether the mobile handset is a source of a RACH overload in the wireless network; and, upon determining that the mobile handset is a source of the RACH overload, to configure the mobile handset to replace usage of a first RACH resource causing the RACH overload with usage of a second RACH resource specified by the mobile communication node.

The use of a separate RACH resource (frequency, preamble sequence, and/or radio subframe access slot) according to the teachings of one embodiment of the present invention to "absorb" high volume RACH signaling traffic from a small number of malicious hosts (or mobile handsets) substantially prevents the DoS attacks in the wireless network. Because of the diversion of the interfering RACH traffic from these malicious hosts to new RACH resource(s) allocated for "absorbing" such RACH traffic, the wireless system is made more robust to signaling DoS attacks.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data information) to the second entity regardless of the type (analog or digital) of those signals. It is further noted that various figures (including component diagrams) shown and discussed herein are for illustrative purpose only, and are not drawn to scale.

Figure 1:
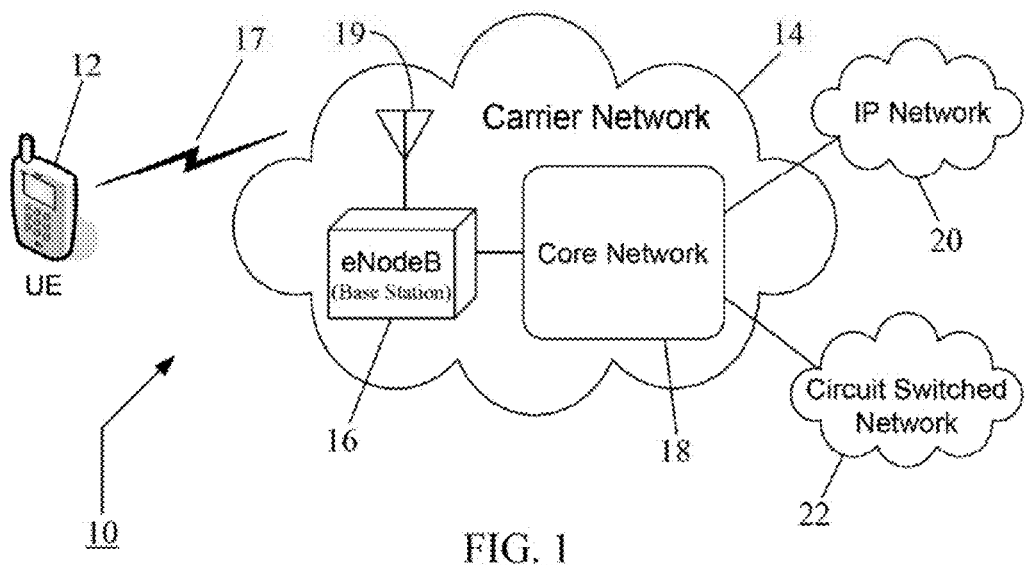
FIG. 1 is a diagram of an exemplary wireless system in which prevention of Denial of Service (DoS) attacks according to the teachings of one embodiment of the present invention may be implemented.

FIG. 1 is a diagram of an exemplary wireless system 10 in which prevention of Denial of Service (DoS) attacks according to the teachings of one embodiment of the present invention may be implemented. The system 10 may include a mobile handset 12 that is in wireless communication with a carrier network 14 of a wireless service provider through a communication node 16 of the carrier network 14. The communication node 16 may be, for example, a base station in a 3G network or an evolved Node-B (eNodeB) when the carrier network is a Long-Term Evolution (LTE) network, and may provide radio interface to the mobile handset 12. In other embodiments, the communication node 16 may also include a site controller, an access point (AP), or any other type of radio interface device capable of operating in a wireless environment. It is noted here that the terms "mobile handset," "wireless handset," and "user equipment (UE)" may be used interchangeably herein to refer to a wireless communication device that is capable of voice and/or data communication via a wireless carrier network. Some examples of such mobile handsets include cellular telephones or data transfer equipments (e.g., a PDA (Personal Digital Assistant), a pager), smartphones (e.g., iPhone™, Android™, Blackberry™, etc.), computers, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UE's).

In addition to providing air interface (e.g., as represented by a wireless link 17 in FIG. 1) to the UE 12 via an antenna 19, the communication node 16 may also perform radio resource management (as, for example, in case of an eNodeB in an LTE system) according to the flow chart illustrated in FIG. 2 and discussed later below. In case of a 3G carrier network 14, the communication node 16 may include functionalities of a 3G base station along with some or all functionalities of a 3G Radio Network Controller (RNC) to performs the tasks identified in FIG. 2. Communication nodes in other types of carrier networks also may be configured similarly. In one embodiment, the node 16 may be configured (in hardware, via software, or both) to carry out the functionalities referred to in the flow chart in FIG. 2. For example, when existing hardware architecture of the communication node 16 cannot be modified, the process steps in FIG. 2 to prevent DoS attacks according to one embodiment of the present invention may be implemented through suitable-programming of one or more processors (e.g., processor 60 in FIG. 6) in the communication node 16. The execution of the program code (by a processor in the node 16) may cause the processor to perform a function or process step in FIG. 2 to implement the desired task. Thus, in the discussion below, although the communication node 16 may be referred to as "performing," "accomplishing," or "carrying out" a function or process, it is evident to one skilled in the art that such performance may be technically accomplished in hardware and/or software as desired.

The carrier network 14 may include a core network 18 coupled to the communication node 16 and providing logical and control functions (e.g., subscriber account management, billing, subscriber mobility management, etc.) in the network 18. In case of an LTE carrier network, the core network 18 may be an AGW (Access Gateway). Regardless of the type of carrier network 14, the core network 18 may function to provide connection of the UE 12 to other mobile handsets operating in the carrier network 14 and also to other communication devices (e.g., wireline phones) or resources (e.g., an Internet website) in other voice and/or data networks external to the carrier network 14. In that regard, the core network 18 may be coupled to a packet-switched network 20 (e.g., an IP (Internet Protocol) network such as the Internet) as well as a circuit-switched network 22 (e.g., the Public-Switched Telephone Network or PSTN) to accomplish the desired connections beyond the devices operating in the carrier network 14. Thus, through the communication node's 16 connection to the core network 18 and the handset's 12 radio link with the communication node 16, a user of the handset 12 may wirelessly (and seamlessly) access many different resources or systems beyond those operating within the carrier network 14 of an operator.

As is understood, the carrier network 14 may be a cellular telephone network in which the UE 12 may be a subscriber unit. However, as mentioned before, the present invention is operable in other non-cellular wireless networks as well (whether voice networks, data networks, or both). Furthermore, portions of the carrier network 14 may include, independently or in combination, any of the present or future wireline or wireless communication networks such as, for example, the PSTN, or a satellite-based communication link. Similarly, as also mentioned above, the carrier network 14 may be connected to the Internet via its core network's 18 connection to the IP (packet-switched) network 20 or may include a portion of the Internet as part thereof.

Figure 2:
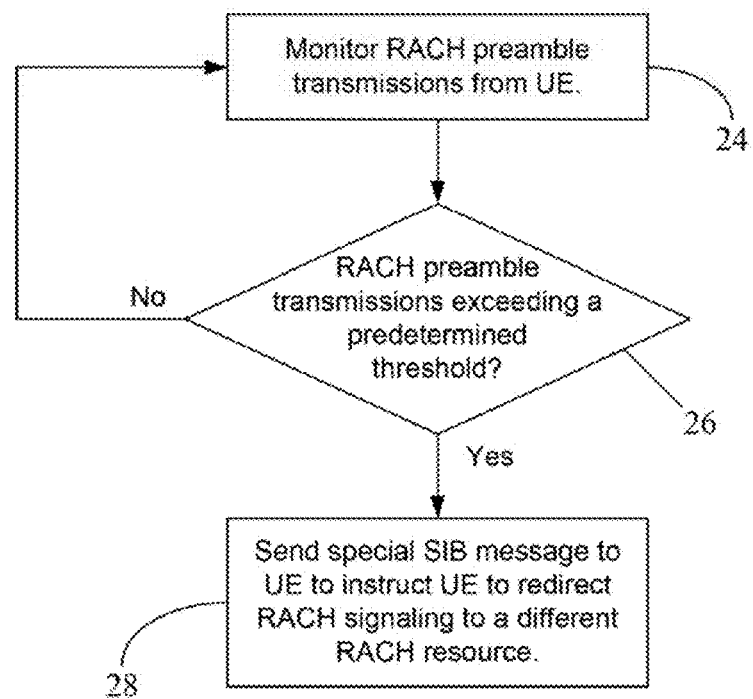
FIG. 2 is an exemplary flow chart of operations that may be carried out in the carrier network in FIG. 1 according to one embodiment of the present invention to prevent DoS attacks.

FIG. 2 is an exemplary flow chart of operations that may be carried out in the carrier network 14 in FIG. 1 (and, more specifically, in the communication node 16 in FIG. 1) according to one embodiment of the present invention to prevent DoS attacks. In the discussion below, the flow chart in FIG. 2 will be explained in conjunction with PRACH (Physical Random Access Channel) signaling illustrated in FIGS. 3-5. As noted before, in a 3G or LTE cellular network (e.g., the carrier network 14 in FIG. 1), a RACH message is used by a UE (e.g., the UE 12 in FIG. 1) to initialize communications with the network. For example, after receiving System Information (SI) broadcasted in a cell (e.g., by the communication node 16), the UE 12 may send a Connection Request message to the network 14 on RACH/PRACH. A RACH message contains a RACH preamble that is sent by the UE 12 via a physical radio channel—referred to as the PRACH channel—to the communication node 16. The preamble may be used by the communication node 16 (e.g., an eNodeB) to synchronize timing with the UE 12. Thus, RACH signaling from a mobile handset 12 is sent to eNodeB 16 through a PRACH channel in a radio frame as discussed below with reference to FIGS. 3-5.

As illustrated at block 24 in FIG. 2, as part of DoS attack prevention, the network 14 may initially monitor RACH preamble transmissions from the UE 12. In one embodiment, the communication node 16 (e.g., eNodeB) in the network 14 may be configured to perform this functionality because it may be receiving PRACH signaling from the mobile handset 12 anyway. For each cell in the network 14, there may be 64 preamble sequences (not shown). These preamble sequences may be partitioned into two sets. Depending on the amount of voice and/or data traffic that the UE 12 intends to send later on, the UE 12 may randomly select a preamble sequence from one of these two sets. It is observed here that RACH preamble formats may have different preamble and cyclic prefix durations to accommodate different cell sizes. For example, Preamble Format-0 (not shown), which may be well suited for small to medium size cells (up to approximately 14 km), uses a full 1 ms subframe (discussed below with reference to FIGS. 3-5) and has a preamble duration of 800 ms with 103 ms cyclic prefix and 97 ms guard time.

Figure 3:
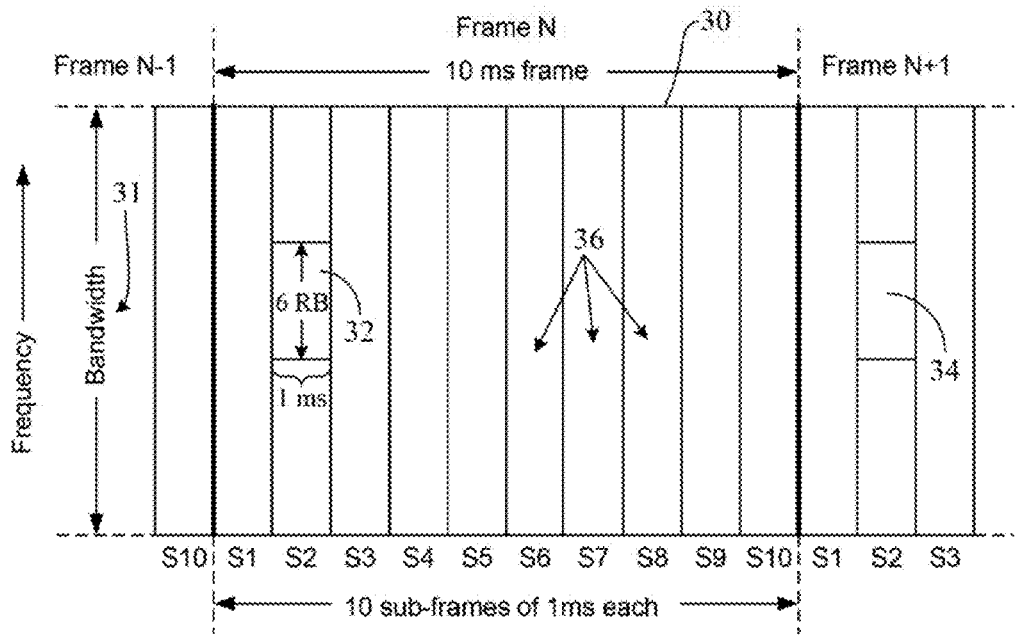
FIG. 3 identifies an exemplary PRACH resource allocation in a radio frame according to one embodiment of the present invention.

As noted before, RACH preambles are transmitted using PRACH resources in a radio frame. FIG. 3 identifies an exemplary PRACH resource allocation in a radio frame 30 according to one embodiment of the present invention. FIG. 3 illustrates one radio frame 30 (Frame N) in a sequence of radio frames (Frames N−1, N, N+1, etc.) that may constitute the communication "link" between the node 16 and the mobile handsets (e.g., the UE 12) in the network 14. In one embodiment, the radio frame 30 may be of a fixed duration and may be divided into a fixed number of equally-sized subframes identified as subframes "S1" through "S10" in FIG. 3. For example, in case of an LTE network 14, each radio frame 30 (i.e., each of Frame N, Frame N+1, etc.) may be of 10 ms duration, and may contain 10 subframes of 1 ms each as shown in FIG. 3. The frequency bandwidth 31 of the radio frame 30 may depend on the overall system bandwidth available in the carrier network 14. In one embodiment, the eNodeB 16 (e.g., through an eNodeB scheduler (not shown)) may allocate specific time and frequency locations in the radio frame 30 as PRACH resources to enable the UE 12 to transmit RACH preambles using these allocated PRACH resources. For example, in the embodiment of FIG. 3, six frequency resource blocks (RB) over a single subframe S2 (of 1 ms duration) may be reserved by the eNodeB 16 as PRACH resources in each radio frame used for uplink transmission (i.e., transmission from UE 12 to the communication node 16) as indicated by two exemplary reference numerals "32" and "34" in FIG. 3. These PRACH resources 32, 34 may be used by mobile handsets in the network 14 to transmit their RACH preambles. The resource blocks (RB) may be typically allocated in a frequency region in the middle of the frequency bandwidth 31 as illustrated in FIG. 3. Each RB may span twelve sub-carriers (not shown) in the frequency domain and, hence, each PRACH resource 32, 34 may consist of 72 subcarriers (in the frequency domain) over a time span of 1 ms (i.e., the subframe duration in time domain) for transmission of RACH preambles from mobile handsets to the communication node 16 in the network 14. Other subframes (e.g., subframes S6, S7, S8, etc.), some of which are identified by reference numeral "36" in the radio frame 30, may provide uplink resources for data (e.g., voice content, text messaging content, etc.) transmission from mobile handsets.

In one embodiment, the communication node 16 may broadcast a regular SIB (System Information Block) message to all mobile handsets in the cell to inform the handsets of the allocated PRACH resources in terms of time (e.g., each second subframe S2 in a radio frame) or frequency locations (e.g., the sub-carrier frequencies in the six RB's) for RACH preamble transmissions. The regular SIB message may be a regular SIB2(System Information Block type-2) message defined according to the LTE standard. A mobile handset wishing to send its RACH preamble may do so only in the allocated PRACH resource of the radio frame. It is observed here that RACH preamble transmissions may be contention based. Thus, as the amount of RACH traffic increases from mobile handsets in the network 14, the probability of collision of transmitted RACH preambles increases. In the extreme case, when the PRACH resource 32 (or 34, etc.) is completely overloaded with a large number of RACH preambles from multiple mobile handsets, no RACH preamble may be detected at the communication node 16. Such overloading of PRACH resources through overloading of RACH signaling may make the carrier network 14 vulnerable to DoS attacks.

It is noted that, in the discussion herein, the terms "RACH resource" and "PRACH resource" may be used interchangeably because PRACH resources are simply the physical transmission "vehicles" for RACH parameters. In other words, PRACH resources are uniquely dedicated for RACH preamble transmissions over the uplink signaling in the air interface (e.g., as represented by the wireless link 17 in FIG. 1) with the communication node 16, and, hence, PRACH resources are essentially physical manifestations of RACH resource requests from the UE 12.

Typically, a mobile handset (e.g., the UE 12) may use a PRACH resource 32, 34 only when needed. In other words, a normally-functioning mobile handset 12 may not transmit RACH preambles on each successive PRACH resource 32, 34, etc., or may not use more than the needed number of PRACH channels (in successive radio frames). However, a maliciously-behaving UE or a UE having poorly designed/corrupted software may transmit RACH signaling too frequently—e.g., over multiple successive PRACH resources in a plurality of successive radio frames. This abnormal amount of PRACH resource usage by a single (defective or maliciously-behaving) mobile handset or by a group of misbehaving mobile handsets may cause PRACH overload of the cell. Thus, as indicated at block 24 in FIG. 2, in one embodiment, the communication node 16 in the network 14 may be configured to continually monitor RACH preamble transmissions from each UE 12 to identify whether the UE 12 is the cause of (or contributes significantly to) the PRACH overload of the cell.

Figure 4:
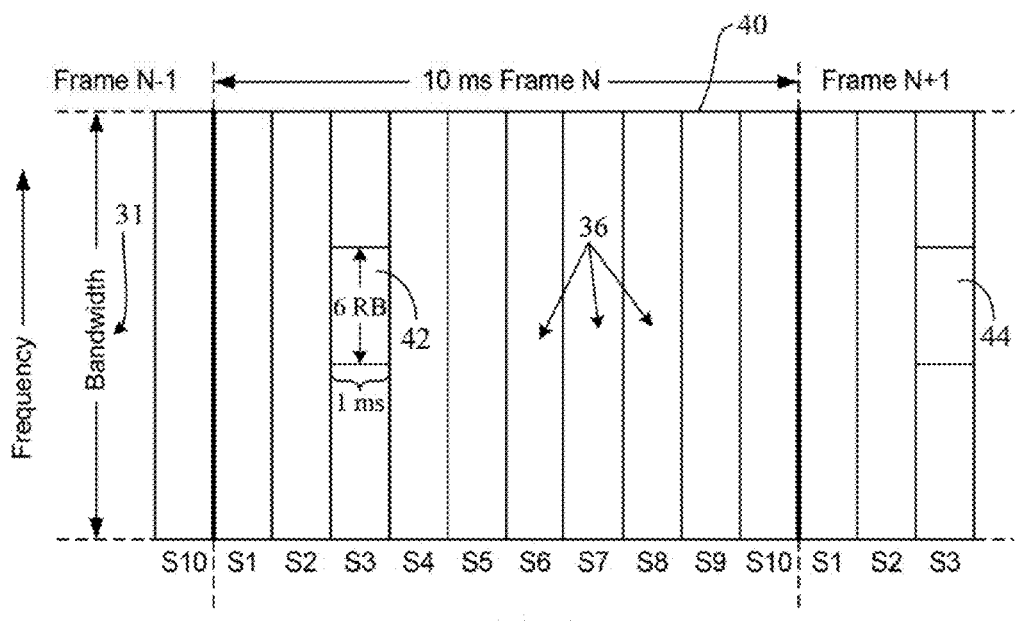
FIG. 4 illustrates an exemplary PRACH resource allocation in a different time slot in a radio frame to substantially prevent DoS attacks according to one embodiment of the present invention.
Figure 5:
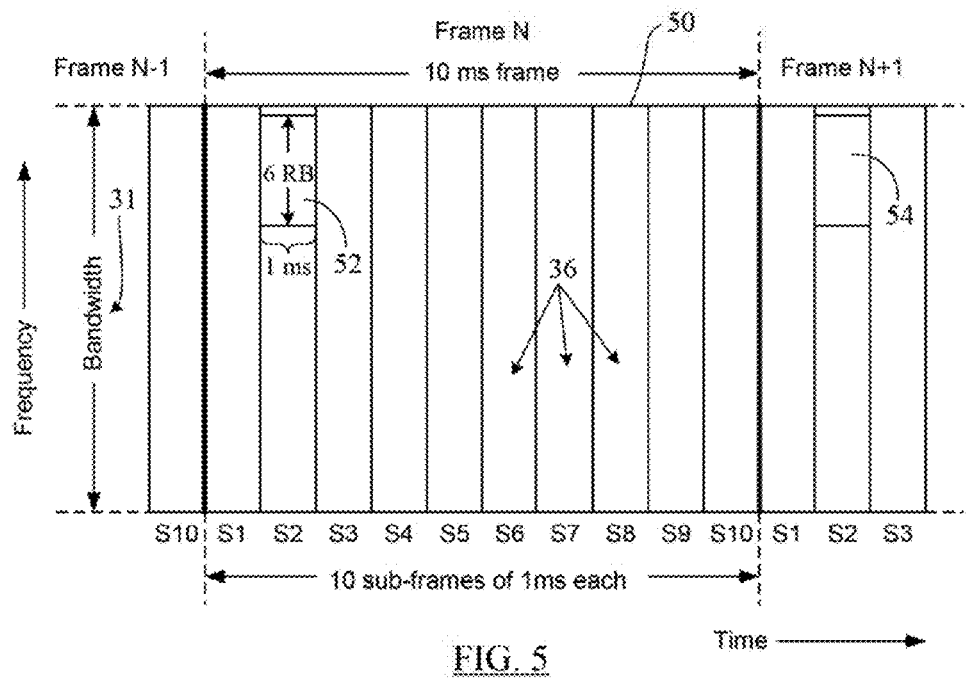
FIG. 5 depicts an exemplary PRACH resource allocation in a different frequency range in a radio frame according to one embodiment of the present invention.

In one embodiment, the UE 12 may be considered to cause PRACH overload of the cell when RACH preamble transmissions from the UE 12 exceed a predetermined threshold—e.g., ten preamble transmissions over ten successive radio frames, or a preamble transmission on each alternate radio frame, or fifty preamble transmissions over a period of 1 second, or at least two preamble transmissions in each set of five radio frames, or some other predetermined threshold as per system design considerations. At block 26 in the embodiment of FIG. 2, the network 14 (e.g., through the communication node 16) may determine whether the UE's 12 RACH preamble transmissions exceed the predetermined threshold. If UE's RACH preamble transmission behavior is "normal" (i.e., does not exceed the predetermined threshold), the communication node 16 may continue its monitoring (at block 24 in FIG. 2). But, if the UE 12 is determined to be a cause of PRACH overload, then as indicated at block 28 in FIG. 2, in one embodiment, the network 14 (e.g., through the communication node 16) may be configured to send a special SIB message (e.g., a special SIB2 message) to UE 12 to instruct the UE 12 to redirect its RACH signaling to a different RACH resource as shown in FIGS. 4-5 and discussed in more detail below. The special SIB message may contain new RACH parameters for such a UE 12, allowing the UE 12 to redirect its RACH signaling to the new RACH resource specified by the communication node 16. Unlike a regular SIB message (e.g., a regular SIB2 message) that is broadcast by the communication node 16 to all mobile handsets in the cell, this special SIB message (at block 28 in FIG. 2) may be sent by the communication node 16 via a Downlink Shared Channel (DL-SCH) mapped on PDSCH (Physical Downlink Shared Channel) as a physical data-bearing channel transmitted over the air interface. This downlink shared channel may not be broadcast to all UE's in the network, but may be addressed specifically to the targeted UE 12 (i.e., the UE or UE's causing the RACH/PRACH overload). In one embodiment, the special SIB message may use signaled PRACH parameters (such as frequency, preamble sequence, and/or subframe access slot) to specify a separate RACH/PRACH resource or a small part of the current RACH/PRACH resource so as to redirect RACH signaling from the targeted UE 12 to this separate PRACH resource (as discussed below with reference to FIGS. 4-5). This may preserve the regular PRACH resource (e.g., the PRACH resource 32, 34, etc., shown in FIG. 3) from being overloaded by a single misbehaving UE or a group of misbehaving UE's.

It is observed here that SIB-related parameters are typically broadcast (by the communication node 16) in a Master Information Block (MIB) message. These parameters include what radio resources are used to carry SIB messages and the periodicity of SIB messages. An MIB is read by all UE's, generally only during the cell selection and re-selection process. Thus, any further update about SIB configuration may be sent only through a UE-specific message. In one embodiment, the communication node 16 may further configure the targeted UE's (e.g., the UE 12 that may be causing RACH overload) SIB reading behavior so that the UE receiving the special SIB message may not read on the regular SIB messages. Instead, the targeted UE may continue to receive and read the special SIB message(s). The communication node 16 may send a "dedicated" message (e.g., a System Information (SI) message) to the misbehaving UE 12 to inform it of the new SIB configuration. Such "dedicated" message may direct the targeted UE 12 to read the special SIB messages from the communication node 16. These special SIB messages may be configured to have a very row periodicity (e.g., one special SIB message every 500 radio frames). In one embodiment, the targeted UE 12 may apply the received special SIB information immediately—i.e., without waiting for any other System Information (SI) messages from the communication node 16.

In one embodiment, the RACH signaling resource to which a misbehaving mobile handset is redirected may be another RACH/PRACH resource—in terms of time or frequency—in a radio frame. FIG. 4 illustrates an exemplary PRACH resource allocation in a different time slot (i.e., subframe "S3" instead of "S2" in FIG. 3) in a radio frame 40 to substantially prevent DoS attacks according to one embodiment of the present invention. The communication node 16 may specify the PRACH resource 42, 44 in subframe "S3" of each radio frame 40 for the misbehaving UE's only, and continue to allocate PRACH resource 32,34 in subframe "S2" (FIG. 3) to normally-functioning UE's. Furthermore, in one embodiment, the communication node 16 may re-allocate less than a full range of PRACH resource. For example, instead of six, only two resource blocks (RB) may be allocated as the PRACH resource 42, 44 for misbehaving UE's. In another embodiment, PRACH resource 52, 54 may occupy less than an entire subframe in time domain. In other embodiments, different PRACH resources with different restrictions in time and frequency domains may be contemplated. As noted before, upon receipt of the downlink special SIB message (e.g., a special SIB2 message) from the communication node 16, the targeted UE 12 may now use the newly-specified RACH/PRACH resource 42, 44 (as illustrated, for example, in FIG. 4) to send subsequent RACH preamble transmissions to the communication node 16. On the other hand, the normal UE's may continue to send their RACH preambles via PRACH 32, 34 in subframe "S2" of the radio frame 30. In other words, the communication node 16 may modify the RACH preamble transmission behavior of targeted UE's by specifying separate RACH/PRACH resource for them, while allowing the normally-functioning UE's to communicate using the original PRACH channel.

FIG. 5 depicts an exemplary PRACH resource allocation in a different frequency range in a radio frame 50 according to one embodiment of the present invention. As illustrated in FIG. 5, in one embodiment, the communication node 16 may re-allocate PRACH resource 52, 54 in an upper region of the frequency bandwidth 31, but in the same subframe "S2" (in the time domain) as in case of the radio frame 30 in FIG. 3. In other words, the single subframe "S2" in a radio frame may be specified by the communication node 16 to allocate PRACH resource 32, 34 (in one frequency region of the bandwidth 31) for normally-functioning UE's as illustrated in FIG. 3 and to allocate PRACH resource 52, 54 (in another (non-overlapping) frequency region of the same bandwidth 31) for misbehaving UE's as illustrated in FIG. 5. Furthermore, as mentioned before, in one embodiment, the communication node 16 may re-allocate less than a full range of PRACH resource. For example, instead of six, only three resource blocks (RB) may be allocated as the PRACH resource 52, 54 for misbehaving UE's. In another embodiment, PRACH resource 52, 54 may occupy less than an entire subframe in time domain. In other embodiments, different PRACH resources with different restrictions in time and frequency domains may be contemplated. As noted before, upon receipt of the downlink special SIB message (e.g., the special SIB2 message) from the communication node 16, the targeted UE 12 may now use the newly-specified RACH/PRACH resource 52, 54 (as illustrated, for example, in FIG. 5) to send subsequent RACH preamble transmissions to the communication node 16. On the other hand, the normal UE's may continue to send their RACH preambles via PRACH 32, 34 of the radio frame 30. In other words, the communication node 16 may modify the RACH preamble transmission behavior of targeted UE's by specifying separate RACH/PRACH resource for them, while allowing the normally-functioning UE's to communicate using the original PRACH channel.

It is noted here that the frequency bandwidth 31 and data resources 36 have been already described before with reference to FIG. 3 and, hence, their discussion is not repeated here for the sake of brevity. It is observed, however, that the radio frames 40 (FIG. 4) and 50 (FIG. 5) are substantially identical to the radio frame 30 (FIG. 3), except for the re-allocation of PRACH resources 42, 44, 52, 54, in the respective radio frames 40 and 50 for one or more misbehaving UE's. The use of different reference numerals—"40" for the radio frame in FIG. 4 and "50" for the radio frame in FIG. 5—for essentially the same radio frame 30 is for ease of illustration of the selective PRACH resource re-allocation (for UE's causing RACH overload) as per the teachings of different embodiments of the present invention. FIGS. 4 and 5 illustrate PRACH reallocation according to the teachings of the present invention without any modification of the standard time-frequency parameters (e.g., frame duration, subframe duration, RB composition, etc.) of a radio frame in the carrier network 14. In other words, all the UE's—normal as well as misbehaving—operating in the carrier network 14 may use the same radio frame, but with different PRACH resources within the radio frame depending on the RACH overload status of the UE as discussed hereinbefore.

In another embodiment, the new RACH resource (for misbehaving UE's) may be a special set of preamble sequences within the existing PRACH time-frequency resource. For example, with reference to FIG. 3, in one embodiment, the normal UE's may use the PRACH resource 32, 34, and the misbehaving UE's (i.e., the UE's causing RACH overload) may also use the PRACH resource 32, 34, except that the misbehaving UE's may be restricted, for example, by the communication node 16, to use the same (or approximately the same) cyclic shift (with possibly different root sequence indices) in their respective preamble sequences. As a result of such restriction on cyclic shift of misbehaving UE's, preamble sequences of normal UE's and misbehaving UE's may have non-overlapping cyclic shifts. Because non-overlapping cyclic shifts do not interfere with one another, the RACH signaling of misbehaving UE's may not adversely impact RACH signaling of normal UE's even when the same PRACH channel 32, 34 is used to transmit the RACH signaling of all UE's—normal as well as misbehaving—to the communication node 16. The communication node 16 may simply ignore the RACH signaling of misbehaving UE's, without treating the PRACH channel 32, 34 as "overloaded." The communication node 16 may deny service to the misbehaving UE's, while continuing to serve the normal UE's without DoS. Thus, misbehaving UE's may be effectively "separated" and their adverse impact confined within themselves.

It is reiterated here that PRACH resource re-allocations illustrated in FIG. 4 (time-based re-allocation) and FIG. 5 (frequency-based re-allocation) are for illustrative purpose only, and these figures do not imply that PRACH resource re-allocation can only occur in one domain (time or frequency). In one embodiment, PRACH reallocation may be performed in a combination of time and frequency domains at the same time. Furthermore, each PRACH re-allocation in FIG. 4 or FIG. 5 may also be combined with additional re-allocation using a special set of preamble sequences (discussed before). In other words, according to the present invention, one or more of RACH resources (frequency, preamble sequence, and/or subframe access slot) may be re-allocated (either singly or in a desired combination) for misbehaving UE's to "absorb" high volume RACH traffic from such small number of malicious hosts/handsets. As discussed before, signaling about the new allocated RACH resource(s) may be sent to these malicious hosts (e.g., using a special SIB2 message as discussed before) to diver their RACH traffic.

Using the teachings of the present invention, 3G and other evolving cellular communication systems (e.g., LTE) may be made more robust to signaling DoS attacks form defective/malicious mobile handsets. It is noted here that the RACH/PRACH resource reallocation according to the teachings of the present invention may be applied, with suitable modifications (as may be apparent to one skilled in the art using the present teachings), to substantially prevent DoS attacks in other wireless systems as well—e.g., WCDMA (Wideband Code Division Multiple Access) systems, WCDMA-based HSPA (High Speed Packet Access) systems, CDMA2000 systems, GSM/EDGE (Global System for Mobile Communications/Enhanced Data Rate for GSM Evolution) systems, and WiMAX (Worldwide Interoperability for Microwave Access) systems. Furthermore, the signaling resource re-allocation methodology discussed herein in the context of combating DoS attacks due to overload of a signaling resource (e.g., RACH resource) may also be implemented—again with suitable modifications as may be apparent to one skilled in the art using the present teachings—to combat unfair usage of any other significant resource (e.g., data resource, frequency resource, etc.) by defective/malicious mobile handsets.

Figure 6:
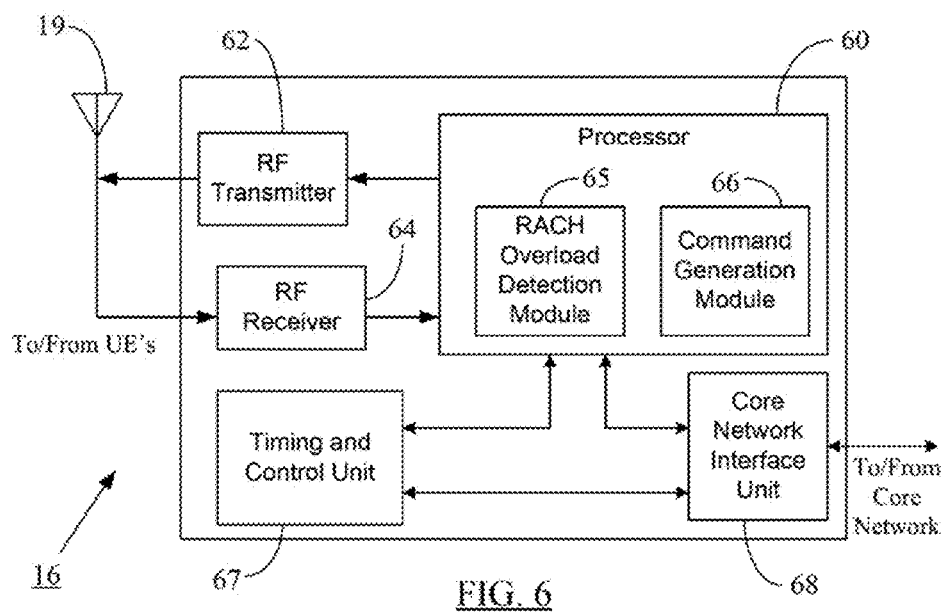
FIG. 6 is a block diagram of an exemplary eNodeB according to one embodiment of the present invention.

FIG. 6 is a block diagram of an exemplary eNodeB (or a similar communication node) 16 according to one embodiment of the present invention. The eNodeB 16 may include a processor 60 to provide radio interface with the mobile handsets (in the carrier network 14) via eNodeB's RF (Radio Frequency) transmitter 62 and RF receiver 64 units coupled to the eNodeB antenna 19. The processor 60 may be configured (in hardware and/or software) to perform all the functions depicted in the exemplary embodiment of FIG. 2. In the context of FIG. 2, the receiver 64 may receive RACH preamble transmissions from the mobile handsets (e.g., UE 12) in the network 14 and submit them to a RACH overload detection module 65 in the processor 60 to enable the module 65 to evaluate which, if any, mobile handsets are causing a RACH overload of the system as discussed hereinbefore. In case of detection of a troublesome UE, the identity of the UE may be conveyed to a command generation module 66 in the processor 60 to enable it to generate appropriate special SIB messages (e.g., special SIB2 messages) for transmission to the targeted UE via the transmitter 62. The processor 60 may also provide additional baseband signal processing (e.g., mobile device registration, channel signal information transmission, radio resource management, etc.) as required. The processor 60 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The eNodeB 16 may further include a timing and control unit 67 and a core network interface unit 68 as illustrated in FIG. 6. The control unit 67 may monitor operations of the processor 60 and the network interface unit 68, and may provide appropriate timing and control signals to these units. The interface unit 68 may provide a bi-directional interface for the eNodeB 1,6 to communicate with the core network 18 to facilitate administrative and call-management functions for mobile subscribers operating in the carrier network 14 through eNodeB 16.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium (not shown) for execution by a general purpose computer or a processor (e.g., the processor 60 in FIG. 6). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method that provides a reaction mechanism to substantially prevent DoS attacks due to RACH overload in cellular wireless networks. Once a mobile handset is identified to cause (or contribute significantly to) a RACH overload of the cell, the system sends a special SIB message targeted to that mobile handset and instructing it to redirect its RACH signaling to a separate RACH/PRACH resource or to a small part of the current RACH/PRACH resource. This allows most or all of the regular RACH/PRACH resource from being overloaded by a single user or a group of users. The use of a separate RACH/PRACH resource (frequency, preamble sequence, and/or radio subframe access slot) to "absorb" high volume RACH signaling traffic from a small number of malicious hosts (or mobile handsets) substantially prevents the DoS attacks in the wireless network. Because of the diversion of the interfering RACH traffic from these malicious hosts to new RACH/PRACH resource(s) allocated for "absorbing" such RACH traffic, the wireless system is made more robust to signaling DoS attacks. In view of limited radio resources available in a wireless network, the prevention of DoS attacks is accomplished with network's existing radio resources and signaling framework, and without significant disruption to network architecture or functionality.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of managing wireless transmissions from a mobile handset operating in a wireless network associated therewith, the method comprising the steps of:
    using a processor in wireless communication with the mobile handset via the wireless network, determining whether the mobile handset is a source of a Random Access Channel (RACH) overload in the wireless network; and
    upon determining that the mobile handset is a source of the RACH overload, configuring the mobile handset, using the processor, to replace usage of a first RACH resource causing the RACH overload with usage of a second RACH resource specified by the processor;
    wherein the mobile handset is part of a group of mobile handsets causing the RACH overload in the wireless network, wherein the second RACH resource includes a first set of preamble sequences for a Physical Random Access Channel (PRACH) in radio frames transmitted from mobile handsets in the group, and wherein the first set of preamble sequences is different from a second set of preamble sequences for the PRACH in the first RACH resource, and wherein the method further comprises the step of:

using the processor, instructing each mobile handset in the group of mobile handsets to use approximately a same cyclic shift in a mobile handset-specific preamble sequence from the first set of preamble sequences.

2. The method of claim 1, wherein the determining includes:

monitoring a number of RACH preamble transmissions from the mobile handset; and identifying the mobile handset as causing the RACH overload when the number of RACH preamble transmissions from the mobile handset in a time interval exceeds a pre-determined threshold.

3. The method of claim 2, wherein the monitoring includes:

receiving the RACH preamble transmissions over a Physical Random Access Channel (PRACH) of a plurality of radio frames transmitted from the mobile handset to the processor.

4. The method of claim 1, wherein configuring the mobile handset includes:

sending a message to the mobile handset from the processor instructing the mobile handset to redirect RACH signaling of the mobile handset from the first RACH resource to the second RACH resource.

5. The method of claim 4, wherein the message is unique to the mobile handset.

6. The method of claim 4, wherein the message is a special System Information Block (SIB) message containing at least an indication of the second RACH resource to enable the mobile handset to redirect the RACH signaling from the first RACH resource to the second RACH resource.

7. The method of claim 6, wherein sending the message includes:

using the processor, configuring the mobile handset to read the special SIB message instead of a regular SIB message sent by the processor to a plurality of mobile handsets in the wireless network.

8. The method of claim 1, wherein the second RACH resource includes one or more of the following:

a first frequency of transmission for a Physical Random Access Channel (PRACH) in a radio frame transmitted from the mobile handset, wherein the first frequency is different from a second frequency of transmission for the PRACH in the first RACH resource;

a first time slot of transmission for the PRACH in the radio frame transmitted from the mobile handset, wherein the first time slot is different from a second time slot of transmission for the PRACH in the first RACH resource; and a first preamble sequence assigned to the mobile handset for transmission through the PRACH in the radio frame transmitted from the mobile handset, wherein the first preamble sequence is different from a second preamble sequence previously used by the mobile handset as part of the first RACH resource.

9. A mobile communication node configured to provide a radio interface to a mobile handset in a wireless network associated with the mobile handset, wherein the mobile communication node comprises:

a receiver operable to receive wireless transmissions from a mobile handset; and a processor operable to:

determine whether the mobile handset is a source of a Random Access Channel (RACH) overload in the wireless network; and configure the mobile handset to replace usage of a first RACH resource causing the RACH overload with usage of a second RACH resource specified by the processor when the processor determines that the mobile handset is a source of the RACH overload;

wherein the mobile handset is part of a group of mobile handsets causing the RACH overload in the wireless network, wherein the second RACH resource includes a first set of preamble sequences for a Physical Random Access Channel (PRACH) in radio frames transmitted from mobile handsets in the group, and wherein the first set of preamble sequences is different from a second set of preamble sequences for the PRACH in the first RACH resources, and wherein the processor is further operable to:

instruct each mobile handset in the group of mobile handsets to use approximately a same cyclic shift in a mobile handset-specific preamble sequence from the first set of preamble sequences.

10. The mobile communication node of claim 9, wherein the processor is operable to determine whether the mobile handset is a source of the RACH overload by:

receiving RACH preamble transmissions through a Physical Random Access Channel (PRACH) of a plurality of radio frames transmitted from the mobile handset;

monitoring a number of the RACH preamble transmissions from the mobile handset in a time interval; and identifying the mobile handset as causing the RACH overload when the number of RACH preamble transmissions from the mobile handset exceeds a pre-determined threshold.

11. The mobile communication node of claim 9, wherein the processor is operable to configure the mobile handset by:

sending a handset-specific message to the mobile handset instructing the mobile handset to redirect RACH signaling of the mobile handset from the first RACH resource to the second RACH resource.

12. The mobile communication node of claim 11, wherein the handset-specific message is a special System Information Block (SIB) message containing at least an indication of the second RACH resource to enable the mobile handset to redirect the RACH signaling from the first RACH resource to the second RACH resource, and wherein the processor is further operable to:

prepare the mobile handset to read the special SIB message instead of a regular SIB message sent by the mobile communication node to a plurality of mobile handsets in the wireless network.

13. The mobile communication node of claim 9, wherein the second RACH resource includes one or more of the following:

a first frequency of transmission for a Physical Random Access Channel (PRACH) in a first radio frame transmitted from the mobile handset, wherein the first frequency is different from a second frequency of transmission for the PRACH in the first RACH resource;

a first time slot of transmission for the PRACH in a second radio frame transmitted from the mobile handset, wherein the first time slot is different from a second time slot of transmission for the PRACH in the first RACH resource; and a first preamble sequence assigned to the mobile handset for transmission through the PRACH in a third radio frame transmitted from the mobile handset, wherein the first preamble sequence is different from a second preamble sequence previously used by the mobile handset as part of the first RACH resource.

14. A method comprising the steps of:

using a processor, establishing wireless communication with a mobile handset via a wireless network associated with the mobile handset;

using the processor, monitoring a number of Random Access Channel (RACH) preamble transmissions from the mobile handset;

using the processor, identifying the mobile handset as a source of a RACH overload when the number of RACH preamble transmissions from the mobile handset in a time interval exceeds a pre-determined threshold; and upon determining that the mobile handset is a source of the RACH overload, configuring the mobile handset, using the processor, to replace usage of a first RACH resource causing the RACH overload with usage of a second RACH resource specified by the processor, wherein the second RACH resource is different from the first RACH resource;

wherein the mobile handset is part of a group of mobile handsets causing the RACH overload in the wireless network, wherein the second RACH resource includes a first set of preamble sequences for a Physical Random Access Channel (PRACH) in radio frames transmitted from mobile handsets in the group, and wherein the first set of preamble sequences is different from a second set of preamble sequences for the PRACH in the first RACH resource, and wherein the method further comprises the step of:

using the processor, instructing each mobile handset in the group of mobile handsets to use approximately a same cyclic shift in a mobile handset-specific preamble sequence from the first set of preamble sequences.

15. The method of claim 14, wherein configuring the mobile handset includes:

sending a handset-specific special System Information Block type-2 (SIB2) message to the mobile handset from the processor instructing the mobile handset to redirect RACH signaling of the mobile handset from the first RACH resource to the second RACH resource.

16. A system for preventing a Denial of Service (DoS) attack in a wireless network, the system comprising:

a mobile handset operable in the wireless network; and a mobile communication node for providing a radio interface to the mobile handset in the wireless network, wherein the mobile communication node is configured to perform the following:

determine whether the mobile handset is a source of a Random Access Channel (RACH) overload in the wireless network; and upon determining that the mobile handset is a source of the RACH overload, configure the mobile handset to replace usage of a first RACH resource causing the RACH overload with usage of a second RACH resource specified by the mobile communication node;

wherein the mobile handset is part of a group of mobile handsets causing the RACH overload in the wireless network, wherein the second RACH resource includes a first set of preamble sequences for a Physical Random Access Channel (PRACH) in radio frames transmitted from mobile handsets in the group, and wherein the first set of preamble sequences is different from a second set of preamble sequences for the PRACH in the first RACH resource, and wherein the mobile communications node is configured to instruct each mobile handset in the group of mobile handsets to use approximately a same cyclic shift in a mobile handset-specific preamble sequence from the first set of preamble sequences.

17. The system of claim 16, wherein the mobile communication node is further configured to perform the following as part of determination of whether the mobile handset is a source of the RACH overload:

monitor a number of RACH preamble transmissions from the mobile handset in a time interval; and identify the mobile handset as causing the RACH overload when the number of RACH preamble transmissions from the mobile handset exceeds a pre-determined threshold.

18. The system of claim 16, wherein the mobile communication node is further configured to perform the following as part of configuration of the mobile handset to replace usage of the first RACH resource:

send a handset-specific special System Information Block (SIB) message containing at least an indication of the second RACH resource to the mobile handset instructing the mobile handset to redirect RACH signaling of the mobile handset from the first RACH resource to the second RACH resource.

19. The system of claim 18, wherein the mobile communication node is further configured to send a handset-specific dedicated message to said mobile handset preparing the mobile handset to read the special SIB message instead of a regular SIB message sent by the mobile communication node to a plurality of mobile handsets in the wireless network.

* * * * *